April 26, 1960

E. H. THOMPSON 2,933,814

PENDULUM DEVICES

Filed Aug. 19, 1958

Inventor
Edgar Hynes Thompson
By
Stevens, Davis, Miller & Mosher
Attorneys

April 26, 1960  E. H. THOMPSON  2,933,814
PENDULUM DEVICES

Filed Aug. 19, 1958  2 Sheets-Sheet 2

Inventor
Edgar Hynes Thompson
By Stevens, Davis, Miller & Mosher
Attorneys

United States Patent Office 2,933,814
Patented Apr. 26, 1960

2,933,814
PENDULUM DEVICES

Edgar Hynes Thompson, North Warnborough, Odiham, England

Application August 19, 1958, Serial No. 755,924

7 Claims. (Cl. 33—73)

This invention concerns pendulum devices, e.g. for supporting the graticule or other reference member and/or for supporting part of the optical system of an optical instrument such, for example, as a theodolite.

According to the invention there is provided a pendulum device comprising a tiltable body at least a portion of which has a constant radius of curvature, a spring member one end of which is anchored to the tiltable body, and a bob disposed beneath the tiltable body and secured to the other end of the spring member, the spring member extending from said anchorage around and in contact with said portion and the part of the spring member which extends between the bob and the tiltable body being tangential to said portion and being vertically disposed.

The invention also concerns a pendulum device comprising a tiltable body having a pair of elements at least a portion of each of which has a constant radius of curvature, the said portions of said elements appearing to intersect or to be tangential to each other, when viewed in elevation, a bob supported from and beneath said tiltable body by a plurality of spring members, each said element having at least one spring member anchored thereto so as to extend around its said constant radius portion, all the said spring members, when the tiltable body is untilted, being tangential to their respective elements at a common point of intersection or at the point of tangency of said constant radius portions, and the centre of gravity of the bob lying vertically below said point.

More particularly, the pendulum device according to the invention comprises a tiltable body constituted by a pair of cylinders, the axes of the said cylinders lying in a common horizontal plane when the tiltable body is untilted and said cylinders appearing to intersect or to be tangential when viewed in the direction of their axes of curvature, a bob supported from and beneath said tiltable body by a plurality of spring strips, each cylinder having at least one spring strip anchored thereto so as to extend around a portion of the circumference thereof, said portion being adjacent to the region in which the cylinders appear to intersect or to be tangential, all the strips, when the tiltable body is untilted, being tangential to their respective cylinders at a common point of intersection or at the point of tangency of said cylinders and the centre of gravity of the bob lying vertically below said point.

The term "common point of intersection" is to be understood to refer to what appears to be a common point of intersection when the device is viewed in elevation. The term "point of tangency" is, of course, to be similarly understood.

In one embodiment of the invention the cylinders appear to intersect and the strips are connected to spaced points on the bob so that, when the tiltable body is untilted, the bob and said strips form a triangle whose apex is constituted by a said point of intersection.

In an alternative embodiment of the invention, the cylinders appear to be tangential and the strips are connected to the bob at a point or points which lie vertically below the point of tangency.

The invention is illustrated, merely by way of example, in the accompanying drawings in which.

Figure 1:
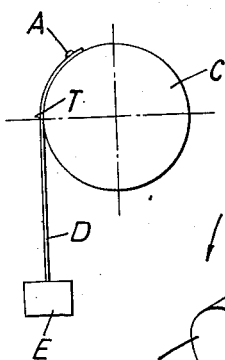
Figure 1 is a sketch showing diagrammatically one embodiment of a pendulum device according to the invention.

Referring first to Figure 1, there is shown a pendulum device comprising a cylinder C to which is anchored at A one end of a spring strip D. The other end of the spring strip D carries a bob E which is disposed beneath the cylinder C. The spring strip D has a vertical portion extending between the bob E and a point T on the cylinder, the said vertical portion being tangential to the cylinder at T. Between T and the anchorage A the spring strip D extends in contact with the circumference of the cylinder.

It may be shown that the force tending to displace the bob E is due to the bending moment at the point T which, in its turn, depends upon the radius of curvature of the cylinder C. For a small rotation of the cylinder C (e.g. through an angle of 10 minutes) the radius of curvature at T of the strip D will remain constant and the change in length of the said vertical portion of the strip may be neglected. Thus the force on the bob E, for small tilts of the cylinder C, will remain substantially constant and the disposition of the bob E with respect to the horizontal, will not change.

Figure 2:
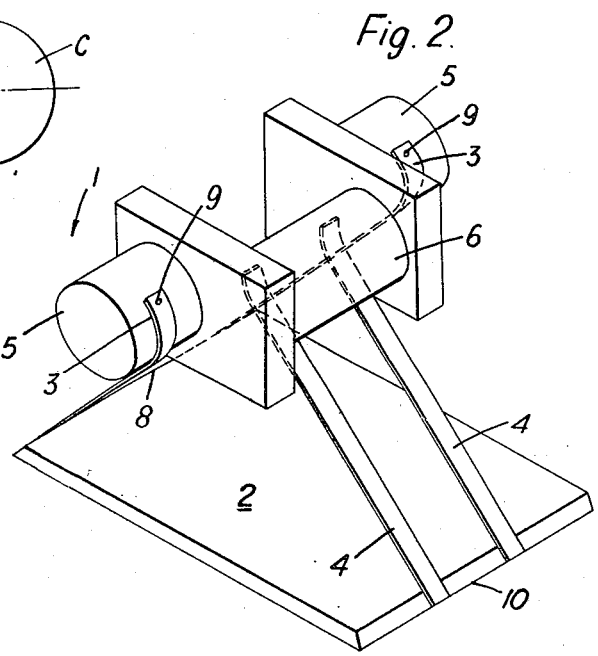
Figure 2 is a diagrammatic perspective view of a second embodiment of a pendulum device according to the invention.
Figure 3:
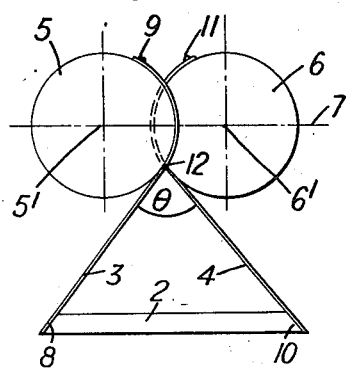
Figure 3 is a diagrammatic front elevation of the device shown in Figure 2.

There is shown in Figures 2 and 3 a pendulum device comprising a tiltable curved body, generally indicated by the reference numeral 1, and a bob 2 supported from and beneath the curved body 1 by means of steel spring strips 3, 4, having the same modulus of elasticity.

The curved body 1 is constituted by a crankshaft provided with a pair of spaced concentric cylindrical portions 5 between which is disposed an eccentric cylindrical portion 6. The cylindrical portions (or cylinders) 5, 6 have the same diameter and their axes 5′, 6′ (see Figure 3) lie in a common horizontal plane 7. When the cylinders 5, 6 are viewed in the direction of their axes of curvature (as seen in Figure 3) they appear to intersect. The spring strips 3 extend from the opposite corners at one end 8 of the bob 2 and are anchored to the cylinders 5 at points 9. The spring strips 4 extend from spaced points at the other end 10 of the bob 2, inwardly of the corners at said end, and are anchored to the cylinders 6 at points 11. It will be noted from Figure 3, which shows the tiltable body 1 in its untilted state (i.e. the state in which the plane 7 is perfectly horizontal), that the strips 3, 4 cross each other at a horizontal line 12 constituting the lower point of intersection of the cylinders 5, 6. The strips 3, 4 are tangential to their cylinders at this line and the centre of gravity of the bob 2 lies, of course, vertically below the line 12.

Accordingly the spring strips 3, 4 extend around portions of their respective cylinders, which portions are adjacent to the region in which the cylinders 5, 6 appear to intersect. As will be seen from Figure 3, the bob 2 and strips 3, 4 together form a triangle whose apex 12 is the lower point of intersection of the cylinders.

The force tending to displace the bob 2 is due to the bending moments at the points 9, 11 which in turn depend on the radius of curvature of the cylinders 5, 6. Hence, as explained above, a small tilt of the cylinders 5, 6 will not be transmitted to the bob 2 whose position with respect to the horizontal will be unaffected.

It is, of course, important that the radius of the cylinders 5, 6 should be large enough in comparison with the thickness of the strips to ensure that the bending of the strips is elastic. The strips may, however, be as wide as may be required to support the bob 2 and any load carried thereby.

Although four strips are shown in Figure 2 more or fewer strips can, of course, be used. Thus the strips 4 can, if desired, be combined into a single strip of the same thickness, but twice the width.

Figure 4:
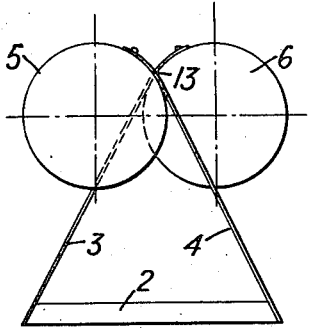
Figure 4 is a diagrammatic front elevation of a modified pendulum device.

A slightly modified pendulum device is illustrated in Figure 4, the device being identical to that of Figures 2 and 3 except that the strips 3, 4 intersect and are tangential to their respective cylinders at the upper point 13 of intersection of the cylinders.

Figure 5:
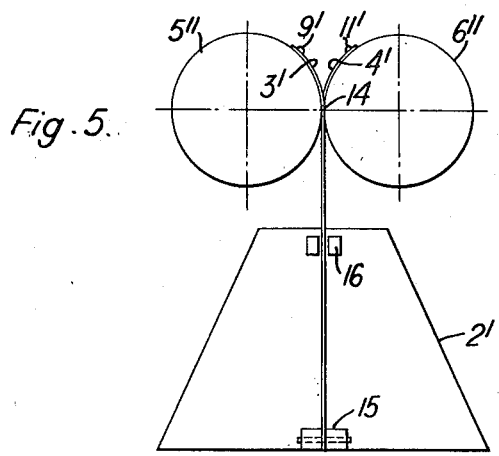
Figure 5 is a diagrammatic front elevation of yet another modified pendulum device.

The angle θ (Figure 3) between the strips 3, 4 may have any value less than 180°. In Figure 5, there is illustrated the case in which θ=0. In the embodiment illustrated in Figure 5, the cylinders 5″, 6″ are tangential at the point 14 and the strips 3′, 4′, which are anchored to the cylinders 5″, 6″ at 9′, 11′ respectively, are anchored to the bottom of the bob 2′ by an anchorage 15, the anchorage lying in the vertical plane containing the point 14. The said vertical plane also contains the centre of gravity of the bob 2′. A steady 16, disposed well above the centre of gravity of the bob 2′, is provided to keep the bob in the upright position shown in Figure 5, i.e. the steady prevents the bob turning about the anchorage 15. It will be seen, from Figure 5, that the strips 3′, 4′ extend adjacent to each other from the anchorage 15 to the point of tangency 14. Apart from the features described above, the construction of Figure 5 is the same as, and works in the same manner as, that of Figures 2 and 3. In the construction shown in Figure 5 the strips 3′, 4′ are long ones so as to ensure that, if the tiltable body should be dropped, the strips will allow the bob 2′ to descend onto stops (not shown) provided immediately beneath the bob, without the strips being strained beyond their elastic limit. If long strips 3′, 4′ are not required, the attachment of the strips to the bob 2′ could be above the centre of gravity of the bob and as close to the cylinders as desired.

The constructions described above have the advantage that they can be made as stout as they need to be to support the bob and any load carried thereby. It will be appreciated that in the case of the constructions shown in Figures 2–5 in which a number of strips are used, temperature changes, since they will affect all the strips equally and will also affect the two cylinders equally, should not affect the accuracy of the device.

Figure 6:
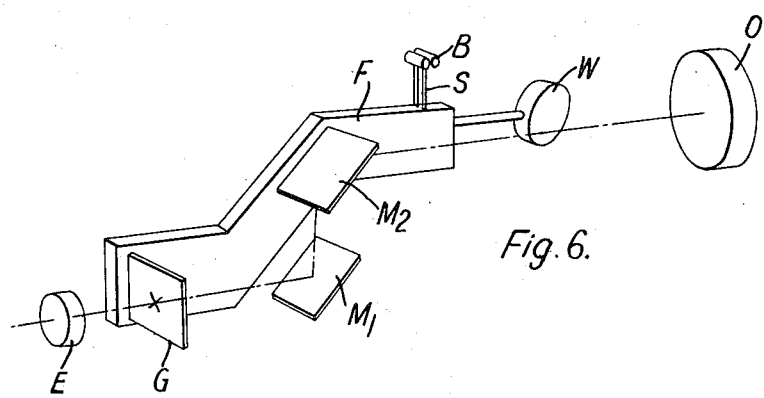
Figure 6 is a diagrammatic perspective view of a level some parts of which may be carried by a pendulum device according to the invention.
Figure 7:
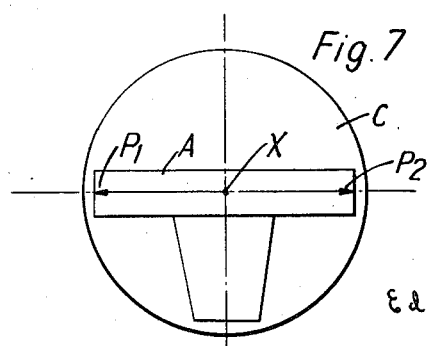
Figure 7 is a diagrammatic front elevation of a vertical circle reader of a theodolite parts of which may be carried by a pendulum device according to the invention.

In Figures 6 and 7, there are illustrated two instruments in which the pendulum device according to the invention may be used.

In Figure 6, there is shown a level comprising an objective O, an eye-piece E and a mirror $M_1$, all of which are fixed to the body (not shown) of the instrument. The graticule G and a mirror $M_2$ of the instrument are carried by a frame F supported, by means of steel strips S, from a tiltable curved body B of the kind shown in any of Figures 3–5, the frame F being counter-balanced by a weight W. The frame F and counterweight W constitute, of course, a bob. The curved body B preferably lies in the plane of the mirror $M_1$ and is disposed as far from it as possible. The curved body B will, of course, be fixed to the body of the instrument so as to tilt therewith.

In Figure 7, there is shown a vertical circle reader of a theodolite. Referring to this figure, the vertical circle C is read by pointers $P_1$, $P_2$ carried on an arm A rotatably mounted about an axis X. The arm A constitutes the bob of a pendulum device according to the invention. The pointers $P_1$, $P_2$ are thus arranged to read angles from the true horizontal. The tiltable body (not shown) of the pendulum device is, of course, fixed to the body of the theodolite so as to tilt therewith.

The pointers $P_1$, $P_2$ are merely indicated diagrammatically in Figure 7. They may, if desired, be constituted by verniers or by the lines of sight of optical micrometers.

I claim:

1. A pendulum device comprising a tiltable body having a pair of elements at least a portion of each of which has a constant radius of curvature, the said portions of said elements appearing to intersect each other when viewed in the direction of the axes of curvature, a bob supported from and beneath said tiltable body by a plurality of spring members, each said element having at least one spring member anchored thereto so as to extend around its said constant radius portion, all the said spring members, when the tiltable body is untilted, being tangential to their respective elements at a common point of intersection of said constant radius portions, and the centre of gravity of the bob lying vertically below said point.

2. A pendulum device comprising a tiltable body having a pair of elements at least a portion of each of which has a constant radius of curvature, the said portions of said elements appearing to be tangential to each other when viewed in the direction of the axes of curvature, a bob supported from and beneath said tiltable body by a plurality of spring members, each said element having at least one spring member anchored thereto so as to extend around its said constant radius portion, all the said spring members, when the tiltable body is untilted, being tangential to their respective elements at the point of tangency of said constant radius portions, and the centre of gravity of the bob lying vertically below said point.

3. A pendulum device comprising a tiltable body constituted by a pair of cylinders, the axes of the said cylinders lying in a common horizontal plane when the tiltable body is untilted and said cylinders appearing to intersect when viewed in the direction of the axes of curvature, a bob supported from and beneath said tiltable body by a plurality of spring strips, each cylinder having at least one spring strip anchored thereto so as to extend around a portion of the circumference thereof, said portion being adjacent to the region in which the cylinders appear to intersect, all the strips, when the tiltable body is untilted, being tangential to their respective cylinders at a common point of intersection of said cylinders and the centre of gravity of the bob lying vertically below said point.

4. A pendulum device as claimed in claim 3 in which the strips are connected to spaced points on the bob, so that, when the tiltable body is untilted, said strips form, when viewed in said direction, two sides of a triangle whose apex is constituted by said point of intersection.

5. A pendulum device comprising a tiltable body constituted by a pair of cylinders, the axes of the said cylinders lying in a common horizontal plane when the tiltable body is untilted and said cylinders appearing to be tangential when viewed in the direction of the axes of curvature, a bob supported from and beneath said tiltable body by a plurality of spring strips, each cylinder having at least one spring strip anchored thereto so as to extend around a portion of the circumference thereof, said portion being adjacent to the region in which the cylinders appear to be tangential, all the strips, when the tiltable body is untilted, being tangential to their respective cylinders at a common point of tangency of said cylinders and the centre of gravity of the bob lying vertically below said point.

6. An optical instrument having a frame, a body secured thereto and tiltable therewith, said tiltable body comprising a pair of elements at least a portion of each of which has a constant radius of curvature, the said portions of said elements appearing to intersect each other when viewed in the direction of the axes of curvature, a bob supported from and beneath said tiltable body by a plurality of spring members, each said element having at least one spring member anchored thereto so as to extend around its said constant radius portion, all the said spring members, when the tiltable body is untilted, being tangential to their respective elements at a common point of intersection of said constant radius portions, the centre of gravity of the bob lying vertically below said point, and a graticule supported by said bob.

7. An optical instrument having a frame, a body secured thereto and tiltable therewith, said tiltable body comprising a pair of elements at least a portion of each of which has a constant radius of curvature, the said portions of said elements appearing to intersect each other when viewed in the direction of the axes of curvature, a bob supported from and beneath said tiltable body by a plurality of spring members, each said element having at least one spring member anchored thereto so as to extend around its said constant radius portion, all the said spring members, when the tiltable body is untilted, being tangential to their respective elements at a common point of intersection of said constant radius portions, the centre of gravity of the bob lying vertically below said point, and an optical system a part of which is supported by the bob and a part of which is supported by the frame.

References Cited in the file of this patent

UNITED STATES PATENTS 2,779,231     Drodofsky _____ Jan. 29, 1957

FOREIGN PATENTS 774,437     Great Britain _____ May 8, 1957

UNITED STATES PATENT OFFICE

CERTIFICATE OF CORRECTION

Patent No. 2,933,814            April 26, 1960

Edgar Hynes Thompson

It is hereby certified that error appears in the above numbered patent requiring correction and that the said Letters Patent should read as corrected below.

In the heading to the printed specification, between lines 5 and 6 thereof, insert -- Claims priority, application Great Britain August 23, 1957 --.

Signed and sealed this 20th day of September 1960.

(SEAL)
Attest:

KARL H. AXLINE
Attesting Officer

ROBERT C. WATSON
Commissioner of Patents